United States Patent
Won

(10) Patent No.: US 10,844,802 B2
(45) Date of Patent: Nov. 24, 2020

(54) METHOD FOR AVOIDING MEASUREMENT ERROR OF AIR FLOW SENSOR

(71) Applicants: HYUNDAI MOTOR COMPANY, Seoul (KR); KIA MOTORS CORPORATION, Seoul (KR)

(72) Inventor: Min-Kyu Won, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 164 days.

(21) Appl. No.: 16/189,261

(22) Filed: Nov. 13, 2018

(65) Prior Publication Data
US 2019/0195159 A1  Jun. 27, 2019

(30) Foreign Application Priority Data
Dec. 27, 2017 (KR) .......................... 10-2017-0181228

(51) Int. Cl.
| | | |
|---|---|---|
| *F02D 41/22* | (2006.01) | |
| *F02D 41/14* | (2006.01) | |
| *F02D 41/18* | (2006.01) | |
| *F02D 41/00* | (2006.01) | |

(52) U.S. Cl.
CPC ......... *F02D 41/222* (2013.01); *F02D 41/144* (2013.01); *F02D 41/18* (2013.01); *F02D 41/0002* (2013.01); *F02D 2200/04* (2013.01); *F02D 2200/0418* (2013.01)

(58) Field of Classification Search
CPC ...... F02D 41/222; F02D 41/144; F02D 41/18; F02D 2200/0418; F02D 41/0002; F02D 2200/04; G01F 25/0053; G01F 15/00
See application file for complete search history.

(56) References Cited

U.S. PATENT DOCUMENTS

| | | | | |
|---|---|---|---|---|
| 7,243,538 B1 * | 7/2007 | Ramsesh | ................ | G01F 1/698 73/204.21 |
| 7,726,187 B2 * | 6/2010 | Sukegawa | ............. | G01F 1/6983 73/204.27 |
| 8,290,685 B2 * | 10/2012 | Yamaoka | ............ | F02D 41/0245 60/285 |
| 9,482,570 B2 * | 11/2016 | Baumeister | ......... | G01F 25/0007 |
| 2007/0144250 A1 * | 6/2007 | Ramsesh | ............. | G01F 25/0053 73/204.22 |
| 2008/0295590 A1 * | 12/2008 | Sukegawa | ............... | G01F 1/688 73/204.26 |
| 2011/0166768 A1 * | 7/2011 | Yamaoka | ............ | F02D 41/1447 701/103 |

(Continued)

*Primary Examiner* — Freddie Kirkland, III
(74) *Attorney, Agent, or Firm* — Morgan, Lewis & Bockius LLP

(57) ABSTRACT

A method for avoiding a measurement error of an air flow sensor for a vehicle includes an engine control unit (ECU) which predicts, in advance, occurrence of the contamination by foreign materials included in the air or condensation of moisture on a sensor measurement plate of the air flow sensor, and performs an operation for preventing the contamination by foreign materials or the condensation of moisture when the occurrence is predicted, to avoid the measurement error of the air flow sensor due to the contamination by foreign materials or the condensation of moisture on the sensor measurement plate.

20 Claims, 6 Drawing Sheets

(56) References Cited

U.S. PATENT DOCUMENTS

2015/0020570 A1* 1/2015 Wuebbeke ................ G01F 1/68
　　　　　　　　　　　　　　　　　　　　　　　73/1.16
2015/0226596 A1* 8/2015 Baumeister .............. G01F 1/68
　　　　　　　　　　　　　　　　　　　　　　　73/1.16

* cited by examiner

METHOD FOR AVOIDING MEASUREMENT ERROR OF AIR FLOW SENSOR

CROSS-REFERENCE TO RELATED APPLICATIONS

This application claims priority to Korean Patent Application No. 10-2017-0181228, filed on Dec. 27, 2017, which is incorporated herein by reference in its entirety.

TECHNICAL FIELD

The present disclosure relates to an air flow sensor mounted in an exhaust system of a vehicle, and more particularly, to a method for avoiding a measurement error of an air flow sensor capable of avoiding a measurement error from occurring in the air flow sensor due to contamination by foreign materials included in air, condensation of moisture, or the like.

BACKGROUND

In order to accurately calculate an amount of intake air of an engine, an air flow sensor (AFS) is mounted in an exhaust system of a vehicle to directly measure a flow rate of air passing through the exhaust system.

In the air flow sensor, a flow around a sensor measurement plate is a very important factor due to a characteristic of the sensor that a flow rate is measured based on a change in temperature around the sensor measurement plate. If a phenomenon that the periphery of the sensor measurement plate is contaminated by foreign materials or moisture is condensed occurs, a flow around the sensor measurement plate becomes unstable and as a result, an error occurs in a measurement value.

A phenomenon that the sensor measurement plate is contaminated by particulate matter or ultrafine particles included in the intake air has actually occurred, and a case in which a large sensor measurement error occurs since moisture around the sensor measurement plate is condensed due to a change in a surrounding environment (temperature, humidity, and the like) has been reported. In severe cases, a measurement error of 80% or more occurs, such that fuel efficiency is deteriorated, accidental fire is caused, and even a phenomenon that an engine is turned off occurs.

In order to prevent such a problem, sensor manufacturers have made an effort to improve a hardware (H/W) structure of the sensor, but the measurement error problem due to contamination of the sensor measurement plate by foreign materials and condensation of moisture has not yet been completely solved.

Further, since the environmental problems such as particulate matter or ultrafine particles in air are worsening day by day, it is expected that severity of the measurement error problem of the air flow sensor as described above will continuously increase.

SUMMARY

An embodiment of the present disclosure is directed to a method for avoiding a measurement error of an air flow sensor capable of solving a measurement error problem caused by contamination by foreign materials and condensation of moisture on a sensor measurement plate that is hard solve only by improving a hardware structure, in a software manner.

Other objects and advantages of the present disclosure can be understood by the following description, and become apparent with reference to the embodiments of the present disclosure. It is obvious to those skilled in the art to which the present disclosure pertains that the objects and advantages of the present disclosure can be realized by the means as claimed and combinations thereof.

In accordance with an embodiment of the present disclosure, in a method for avoiding a measurement error of an air flow sensor, an engine control unit (ECU) of a vehicle predicts, in advance, occurrence of contamination by foreign materials included in air or condensation of moisture on a sensor measurement plate of the air flow sensor, and performs an operation for preventing the contamination by foreign materials or the condensation of moisture when the occurrence is predicted, to avoid the measurement error of the air flow sensor due to the contamination by foreign materials or the condensation of moisture on the sensor measurement plate.

The predicting of the occurrence of the contamination by foreign material may be performed based on a concentration of particulate matter measured by a particulate matter sensor installed in the vehicle.

The predicting of the occurrence of the contamination by foreign material may be performed based on a concentration of particulate matter obtained based on an official environment report and current vehicle location data.

In the predicting of the occurrence of the contamination by foreign material, it may be predicted that the contamination by foreign materials occurs when the concentration of particulate matter is equal to or more than a reference value determined through an experiment.

The predicting of the occurrence of the condensation of moisture may be performed by calculating a dew point based on a humidity value measured by a humidity sensor installed in the vehicle and an amount of change in temperature measured by a temperature sensor.

In a case of a vehicle in which the humidity sensor is not installed, the humidity value may be obtained based on an official environment report and current vehicle location data.

When there is no information on humidity at all, the condensation of moisture may be predicted based on experiential mapping data based on the amount of change in temperature measured by the temperature sensor.

The operation for preventing the contamination by foreign materials or the condensation of moisture may heat the entire sensor measurement plate including a temperature sensor portion of the air flow sensor for a predetermined time.

The heating may be performed using a chip heating function provided in the air flow sensor itself.

When the chip heating function is not provided in the air flow sensor, the operation for preventing the contamination by foreign materials or the condensation of moisture may turn off the sensor measurement plate for a predetermined time.

While the chip heating function is used or the sensor measurement plate is turned off, a model value through an intake air pressure or an opening amount of a throttle may replace the flow rate value In accordance with another embodiment of the present disclosure, a method for avoiding a measurement error of an air flow sensor is performed by an electronic control unit (ECU) which is configured to perform: an air flow sensor flow rate measurement step of measuring an intake air flow rate by the air flow sensor; a foreign material contamination or moisture condensation occurrence prediction step of predicting occurrence of contamination by foreign materials or condensation of moisture on a sensor measurement plate of the air flow sensor; a foreign material contamination or moisture condensation preventing operation performance step of performing an operation for preventing the occurrence of the contamination by foreign materials or condensation of moisture on the sensor measurement plate when the occurrence of the contamination by foreign materials or condensation of moisture on the sensor measurement plate is predicted in the foreign material contamination or moisture condensation occurrence prediction step; and a foreign material contamination or moisture condensation preventing operation termination step of returning to the air flow sensor flow rate measurement step again after performing the foreign material contamination or moisture condensation preventing operation performance step for a predetermined time.

When the occurrence of the contamination by foreign materials or condensation of moisture on the sensor measurement plate is not predicted in the foreign material contamination or moisture condensation occurrence prediction step, the method may return to the air flow sensor flow rate measurement step to continuously measure the intake air flow rate by the air flow sensor.

In the foreign material contamination or moisture condensation occurrence prediction step, the predicting of the occurrence of the contamination by foreign material may be performed based on a concentration of particulate matter measured by a particulate matter sensor installed in the vehicle.

In the foreign material contamination or moisture condensation occurrence prediction step, the predicting of the occurrence of the contamination by foreign material may be performed based on a concentration of particulate matter obtained based on an official environment report and current vehicle location data.

In the predicting of the occurrence of the contamination by foreign material, it may be predicted that the contamination by foreign materials occurs when the concentration of particulate matter is equal to or more than a reference value determined through an experiment.

In the foreign material contamination or moisture condensation occurrence prediction step, the predicting of the occurrence of the condensation of moisture may be performed by calculating a dew point based on a humidity value measured by a humidity sensor installed in the vehicle and an amount of change in temperature measured by a temperature sensor.

In a case of a vehicle in which the humidity sensor is not installed, the humidity value may be obtained based on an official environment report and current vehicle location data.

When there is no information on humidity at all, the condensation of moisture may be predicted based on experiential mapping data based on the amount of change in temperature measured by the temperature sensor.

In the foreign material contamination or moisture condensation preventing operation performance step, the operation for preventing the contamination by foreign materials or the condensation of moisture may heat the entire sensor measurement plate including a temperature sensor portion of the air flow sensor for a predetermined time.

The heating may be performed using a chip heating function provided in the air flow sensor itself.

When the chip heating function is not provided in the air flow sensor, the operation for preventing the contamination by foreign materials or the condensation of moisture may turn off the sensor measurement plate for a predetermined time.

During the foreign material contamination or moisture condensation preventing operation performance step, the main air flow sensor may be switched into a manifold absolute pressure (MAP) sensor or a throttle sensor, and the intake air flow rate may be measured using a model value through an intake air pressure or an opening amount of a throttle.

DESCRIPTION OF SPECIFIC EMBODIMENTS

Hereinafter, a method for avoiding a measurement error of an air flow sensor according to the present disclosure will be described in detail with reference to the accompanying drawings. However, detailed descriptions for well-known functions or configurations will be omitted in order not to unnecessarily obscure the gist of the present disclosure.

Before describing the method for avoiding a measurement error of an air flow sensor according to the present disclosure in detail, a measurement principle of the air flow sensor will be described first with reference to FIG. 1.

Figure 1:
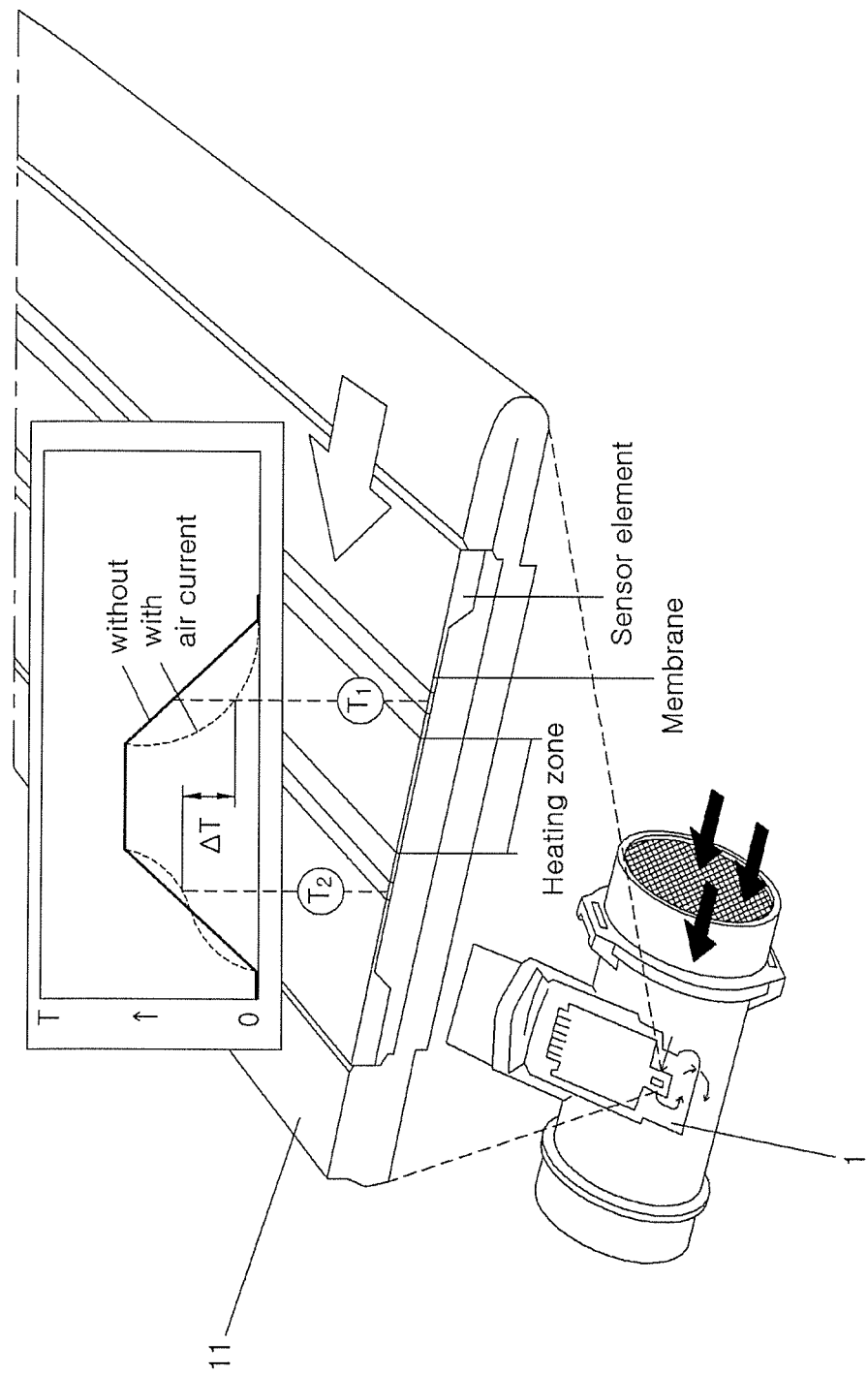
FIG. 1 is a diagram illustrating a measurement principle of an air flow sensor.

FIG. 1 is a diagram illustrating a measurement principle of an air flow sensor, in which an enlarged sensor measurement plate 11 is illustrated and there is an arrow indicating an air flow direction.

Referring to FIG. 1, in the sensor measurement plate 11, temperature sensors are mounted at a first point and a second point positioned at opposite sides based on a heating zone at the center, respectively, and when there is no air flow, temperatures T1 and T2 of the two points are the same as each other. When an air flow is generated in the arrow direction, however, the temperature T1 of the first point positioned at a front side of the heating zone the an air flow direction becomes lower than the temperature T2 of the second point through which the air heated by the heating zone passes, and at this time, a difference in temperature between the two points varies according to a flow rate.

That is, flow rate measurement by an air flow sensor 1 is performed based on a value ($\Delta T = T2 - T1$) of the difference in temperature between the two points measured by the temperature sensors of the sensor measurement plate 11, and thus, a flow rate of air flowing in a reverse direction may also be detected.

The air flow sensor 1 converts the value of the difference in temperature measured in the sensor measurement plate 11 into a voltage value of 0 to 5 V and transfers the voltage value to an engine control unit (ECU), and the ECU receives the voltage value and converts the received voltage value into a flow rate value [kg/h] to thereby calculate an amount of air passing through the exhaust system.

Figure 2:
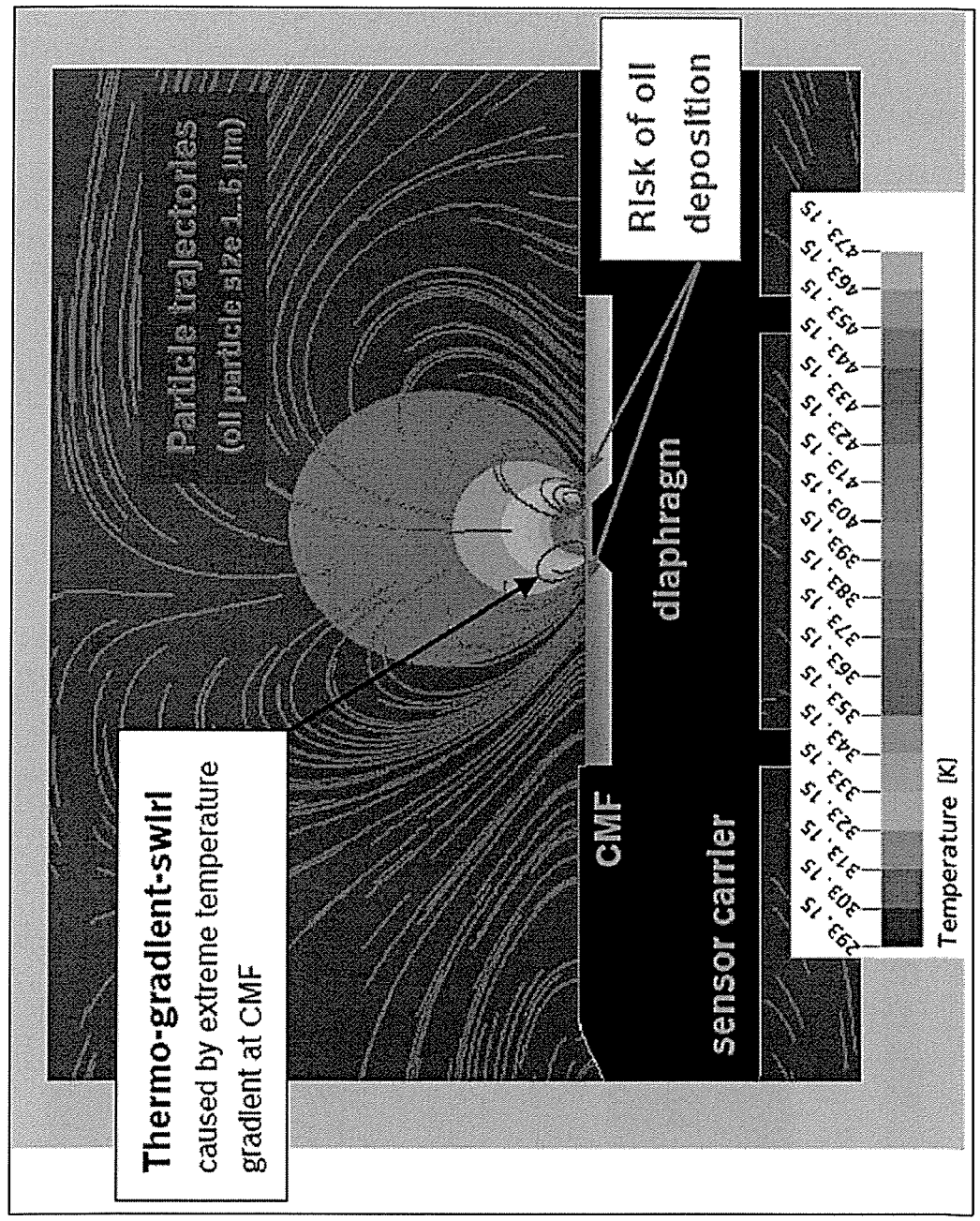
FIG. 2 is a diagram showing a flow field around a sensor measurement plate when measuring a flow rate by the air flow sensor.

FIG. 2 is a diagram showing a flow field around a sensor measurement plate when measuring a flow rate by the air flow sensor.

Describing a principle according to which contamination by foreign materials occurs on the sensor measurement plate 11 when measuring a flow rate by the air flow sensor 1 with reference to FIG. 2, in the sensor measurement plate 11, a swirl flow is formed based on the heating zone at the center due to a difference in temperature occurring between the heating zone at the center which is a heat source and the first and second points at both sides of the heating zone, and such a swirl flow makes foreign materials in the air to be accumulated on the temperature sensors at both sides of the heating zone, thereby causing the contamination by the foreign materials on the sensor measurement plate 11.

Figure 3:
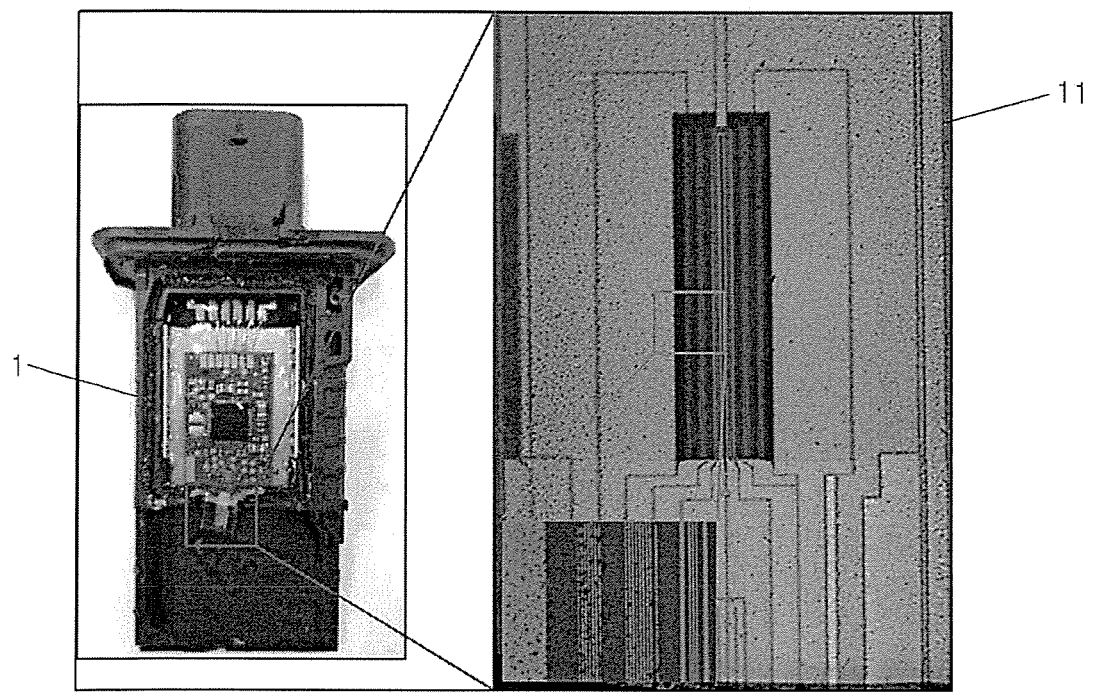
FIG. 3 is a diagram showing a state in which the sensor measurement plate of the air flow sensor is contaminated by foreign materials.

FIG. 3 is a diagram showing a state in which the sensor measurement plate of the air flow sensor is contaminated by foreign materials.

The foreign materials contaminating the sensor measurement plate 11 of the air flow sensor may be various foreign materials such as sands in a desert area in addition to particulate matter or ultrafine particles, and may also include foreign materials such as an oil component included in oil mist such as engine blow-by gas.

Figure 4:
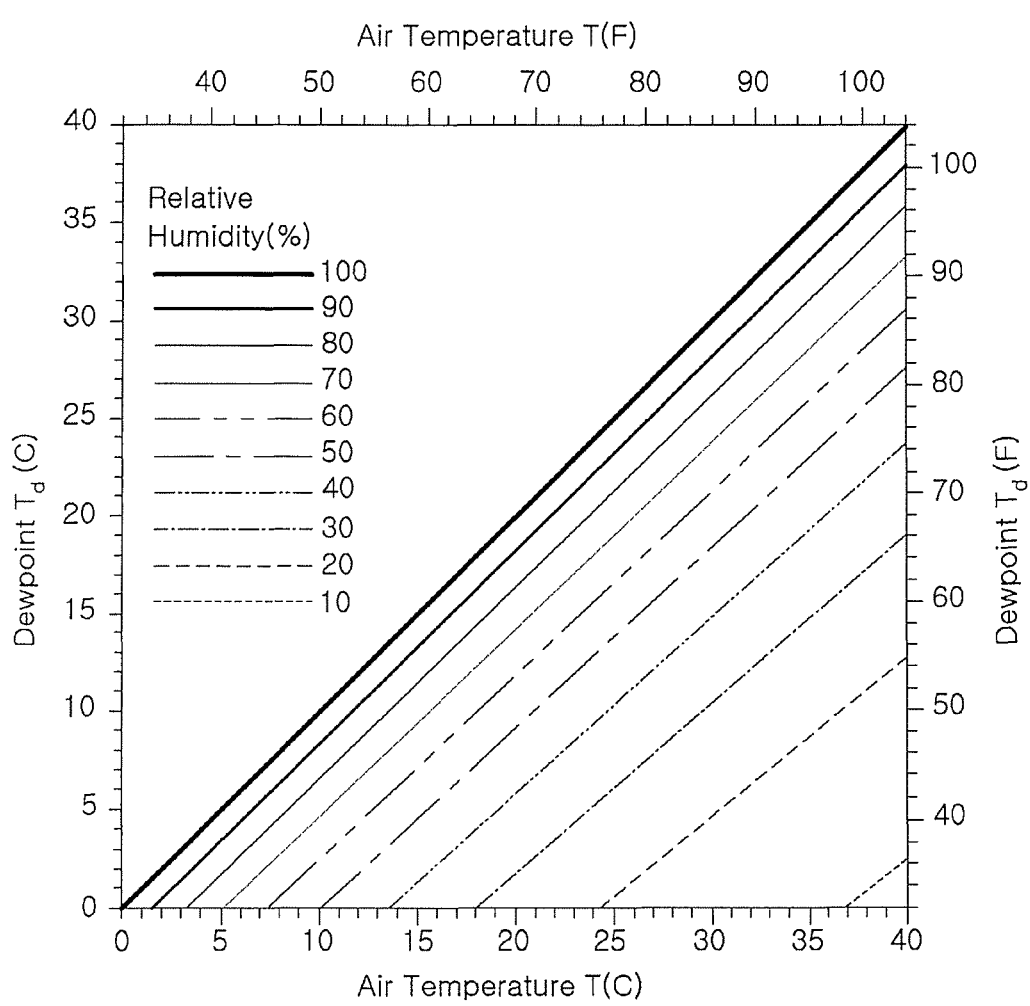
FIG. 4 is a diagram showing a dew point for each temperature and humidity.

FIG. 4 is a diagram showing a dew point for each temperature and humidity.

Describing a situation in which condensation of moisture occurs on the sensor measurement plate 11 with reference to FIG. 4, as a temperature is decreased at the same humidity (an amount of moisture in air), a condensation point is lowered, thus when a temperature of intake air is sharply increased in a situation in which a temperature of the sensor measurement plate 11 is low, for example, when a vehicle is driven in a low temperature and a high humidity area and then enters into a warm place (a garage, a parking lot, or the like) within a short time, a phenomenon that moisture is condensed on the sensor measurement plate 11 occurs.

The method for avoiding a measurement error of an air flow sensor according to the present disclosure may prevent contamination by foreign materials or condensation of moisture from occurring on the sensor measurement plate 11 in advance by predicting the situation in which the contamination by foreign materials or the condensation of moisture occurs on the sensor measurement plate 11 based on the above-described principle according to which the contamination by foreign materials or the condensation of moisture occurs, thereby solving the measurement error problem due to the contamination by foreign materials and the condensation of moisture on the sensor measurement plate 11 without changing a hardware structure of the air flow sensor 1.

According to the present disclosure, the prediction of the occurrence of the contamination by foreign materials may be performed using a concentration of particulate matter measured by a particulate matter (PM) sensor (not illustrated) installed in a vehicle or a concentration of particulate matter obtained based on an official environment report and current vehicle location data.

Further, according to the present disclosure, the prediction of the occurrence of the condensation of moisture may be performed by calculating a dew point based on a humidity value measured by a humidity sensor (not illustrated) installed in the vehicle and an amount of change in temperature measured by a temperature sensor (not illustrated) (see FIG. 4). In a case of a vehicle in which the humidity sensor is not installed, the humidity value may be obtained based on the official environment report and the current vehicle location data.

In a case in which there is no information on humidity at all, the condensation of moisture may also be predicted by mapping to an experiential numerical value based on the amount of change in temperature measured by the temperature sensor (not illustrated) installed in the vehicle.

When it is predicted that the contamination by foreign materials or the condensation of moisture occurs on the sensor measurement plate 11 by the above-described method, the entire sensor measurement plate 11 including the temperature sensors is heated using a chip heating function provided in the sensor itself. Generally, the air flow sensor 1 has the chip heating function for preventing adsorption of oil mist introduced into the exhaust system when the engine is turned off.

Figure 5:
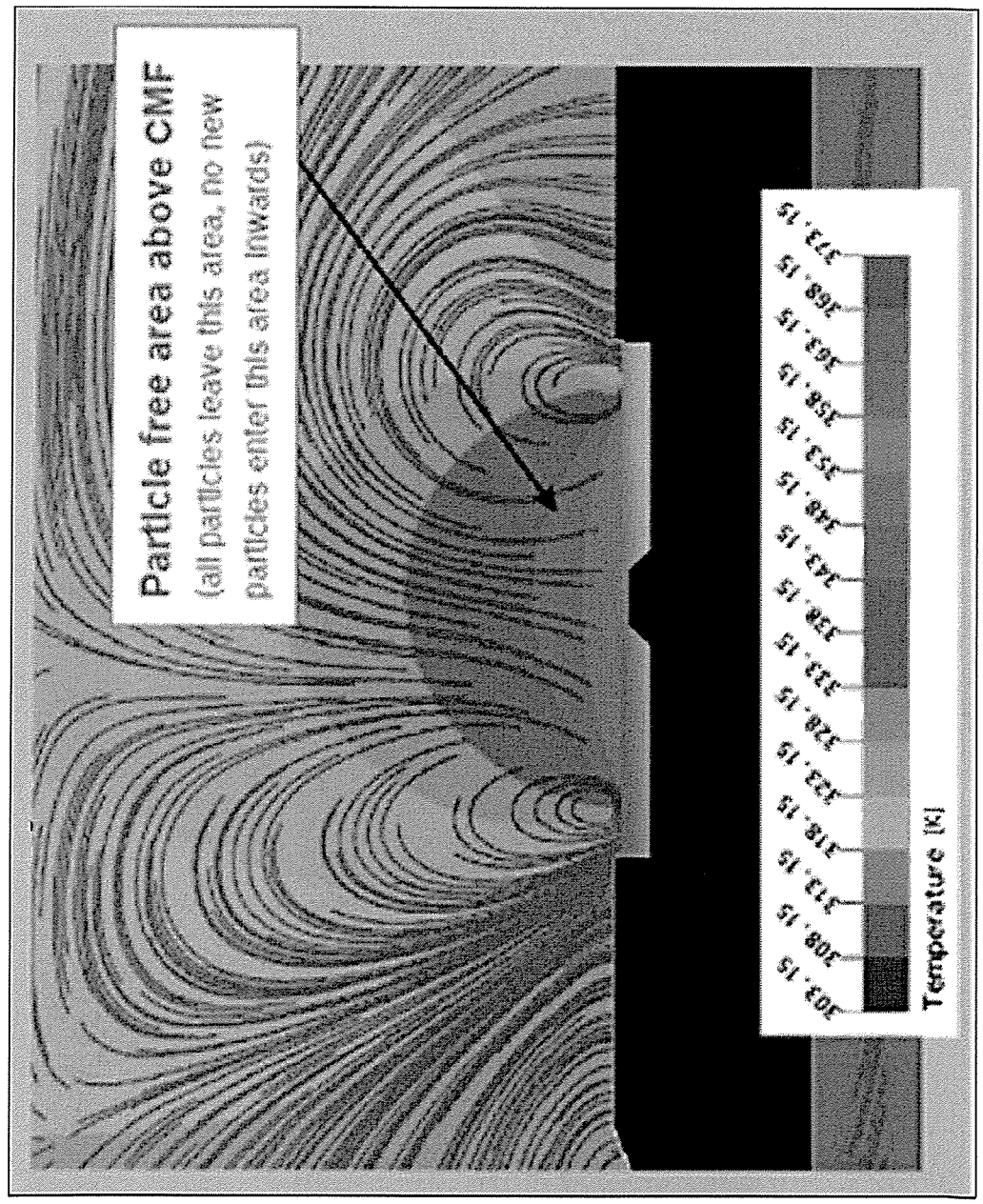
FIG. 5 is a diagram showing a flow field around the sensor measurement plate when performing chip heating by the air flow sensor.

FIG. 5 is a diagram showing a flow field around the sensor measurement plate when performing chip heating by the air flow sensor.

Referring to FIG. 5, when the sensor measurement plate 11 is entirely heated, an upward flow is generated at an entire surface of the sensor measurement plate including the temperature sensor, such that foreign materials in air are not accumulated on the sensor measurement plate 11, thereby preventing the contamination of the sensor measurement plate 11.

Further, when the sensor measurement plate 11 is entirely heated, a temperature of the entire sensor measurement plate is increased to be higher than the dew point, thereby preventing the condensation of moisture on the sensor measurement plate 11.

When the chip heating function is not provided in the air flow sensor 1, a flow causing the contamination by foreign materials around the sensor measurement plate (see FIG. 2) that is generated when measuring a flow rate is removed by turning off the sensor measurement plate 11 for a predetermined time, thereby minimizing the contamination.

While the chip heating function is used or the sensor measurement plate 11 is turned off, the flow rate may not be measured by the sensor measurement plate 11. Therefore, in this case, a model value through an intake air pressure, an opening amount of a throttle, or the like may replace the flow rate value.

When the chip heating function is not provided in the air flow sensor 1, the occurrence of the condensation of moisture of the sensor measurement plate 11 may not be prevented. However, the measurement error problem due to the condensation of moisture on the sensor measurement plate 11 may be solved by replacing the flow rate value with the model value through the intake air pressure, the opening amount of the throttle, or the like without using the measurement of the flow rate by the air flow sensor 11.

As the method for preventing the occurrence of the condensation of moisture on the sensor measurement plate 11, a method of decreasing a difference in temperature between the intake air and the sensor measurement plate 11 by decreasing a temperature of the intake air may also be used, and a detailed description therefor will be omitted.

Figure 6:
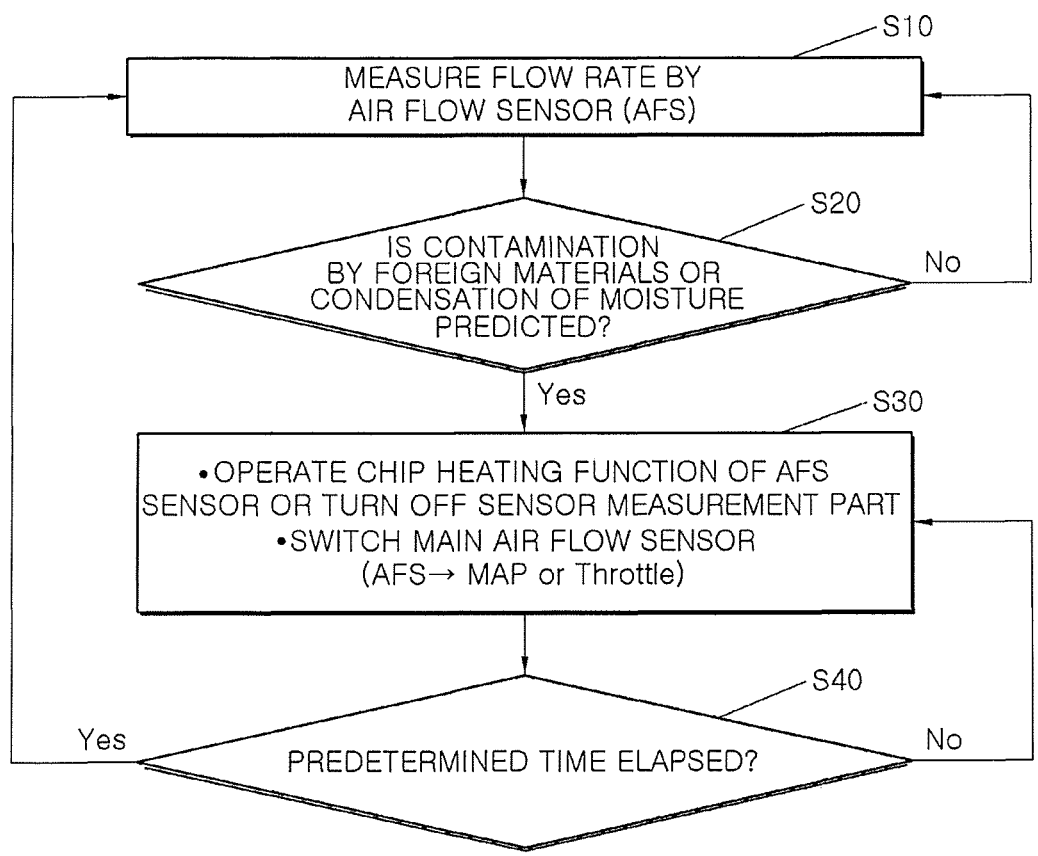
FIG. 6 is a flow chart illustrating steps of a method for avoiding a measurement error of an air flow sensor according to the present disclosure.

FIG. 6 is a flow chart illustrating steps of a method for avoiding a measurement error of an air flow sensor according to the present disclosure.

Referring to FIG. 6, the method for avoiding a measurement error of an air flow sensor according to the present disclosure includes an air flow sensor flow rate measurement step (S10), a foreign material contamination or moisture condensation occurrence prediction step (S20), a foreign material contamination or moisture condensation preventing operation performance step (S30), and a foreign material contamination or moisture condensation preventing operation termination step (S40), and the above steps are performed through a control by the ECU.

The air flow sensor flow rate measurement step (S10) is a step of measuring an intake air flow rate by setting the air flow sensor 1 as a main air flow sensor. At this time, the heating zone positioned at the center of the sensor measurement plate 11 is heated, and the intake air flow rate is calculated based on a value of a difference between temperatures T1 and T2 measured at both sides of the heating zone.

The foreign material contamination or moisture condensation occurrence prediction step (S20) is a step of predicting occurrence of contamination by foreign materials on the sensor measurement plate 11 based on a concentration of particulate matter, or predicting occurrence of condensation of moisture on the sensor measurement plate 11 based on an amount of change in temperature and humidity as described above. At this time, a reference value of the concentration of particulate matter for predicting the occurrence of the contamination by foreign materials may be appropriately determined through an experiment, and well known formulas such as the Magnus formula and the Arden Buck equation may be used to calculate a dew point for predicting the occurrence of the condensation of moisture, and a detailed description therefor will be omitted.

The foreign material contamination or moisture condensation preventing operation performance step (S30) is a step performed when the occurrence of the contamination by foreign materials or condensation of moisture on the sensor measurement plate 11 is predicted in the foreign material contamination or moisture condensation occurrence prediction step (S20), and is a step of preventing the occurrence of the contamination by foreign materials or condensation of moisture on the sensor measurement plate 11 by operating the chip heating function or turning off the sensor measurement plate 11 as described above. At this time, since the intake air flow rate may not be measured by the air flow sensor 1, the main air flow sensor is switched into a manifold absolute pressure (MAP) sensor (not illustrated) or a throttle sensor (not illustrated) and the intake air flow rate is measured using a model value through an intake air pressure or an opening amount of a throttle.

When the occurrence of the contamination by foreign materials or condensation of moisture on the sensor measurement plate 11 is not predicted in the foreign material contamination or moisture condensation occurrence prediction step (S20), the method returns to the air flow sensor flow rate measurement step (S10) to continuously measure the intake air flow rate by the air flow sensor 1.

The foreign material contamination or moisture condensation preventing operation termination step (S40) is a step of returning to the air flow sensor flow rate measurement step (S10) again after performing the foreign material contamination or moisture condensation preventing operation performance step (S30) for a predetermined time. When returning to the air flow sensor flow rate measurement step (S10) the air flow sensor 1 is set as the main air flow sensor again and normally measures the intake air flow rate.

In accordance with the embodiment of the present disclosure, the method for avoiding a measurement error of an air flow sensor solves the measurement error problem caused by contamination by foreign materials and condensation of moisture to prevent loss of fuel efficiency, accidental fire, turning-off of the engine, and the like, thereby enabling stable driving of the vehicle even in a severe environment in which a lot of foreign materials exist in the air or a fluctuation in temperature and humidity is extreme.

The embodiments disclosed in the present specification and the accompanying drawings are used only for the purpose of describing the technical idea of the present disclosure and are not used to limit the scope of the present disclosure described in the appended claims. Therefore, it will be understood by those skilled in the art that various modifications may be made and that other equivalent embodiments are available.

What is claimed is:

1. A method for avoiding a measurement error of an air flow sensor, wherein an engine control unit (ECU) of a vehicle predicts, in advance, occurrence of contamination by foreign materials included in air or condensation of moisture on a sensor measurement plate of the air flow sensor, and performs an operation for preventing the contamination by foreign materials or the condensation of moisture when the occurrence is predicted, to avoid the measurement error of the air flow sensor due to the contamination by foreign materials or the condensation of moisture on the sensor measurement plate.

2. The method of claim 1, wherein in the predicting of the occurrence of the contamination by foreign material, it is predicted that the contamination by foreign materials occurs when a concentration of particulate matter measured by a particulate matter sensor of the vehicle is equal to or more than a reference value determined through an experiment.

3. The method of claim 1, wherein in the predicting of the occurrence of the contamination by foreign materials, it is predicted that the contamination by foreign materials occurs when a concentration of particulate matter, which is obtained based on an official environment report and current vehicle location data, is equal to or more than a reference value determined through an experiment.

4. The method of claim 1, wherein the predicting of the occurrence of the condensation of moisture is performed by calculating a dew point based on a humidity value measured by a humidity sensor of the vehicle and an amount of change in temperature measured by a temperature sensor.

5. The method of claim 1, wherein the predicting of the occurrence of the condensation of moisture is performed by calculating a dew point based on a humidity value, which is obtained based on an official environment report and current vehicle location data.

6. The method of claim 1, wherein the condensation of moisture is predicted based on experiential mapping data based on an amount of change in temperature measured by a temperature sensor.

7. The method of claim 1, wherein the operation for preventing the contamination by foreign materials or the condensation of moisture heats the sensor measurement plate entirely including a temperature sensor for a predetermined time.

8. The method of claim 7, wherein the sensor measurement plate is heated using a chip heating function of the air flow sensor.

9. The method of claim 1, wherein the operation for preventing the contamination by foreign materials or the condensation of moisture turns off the sensor measurement plate for a predetermined time.

10. A method for avoiding a measurement error of an air flow sensor, the method performed by an electronic control unit (ECU) which is configured to perform:

an air flow sensor flow rate measurement step of measuring an intake air flow rate by the air flow sensor;

a foreign material contamination or moisture condensation occurrence prediction step of predicting occurrence of contamination by foreign materials or condensation of moisture on a sensor measurement plate of the air flow sensor;

a foreign material contamination or moisture condensation preventing operation performance step of preventing the occurrence of the contamination by foreign materials or condensation of moisture on the sensor measurement plate when the occurrence of the contamination by foreign materials or condensation of moisture on the sensor measurement plate is predicted in the foreign material contamination or moisture condensation occurrence prediction step; and a foreign material contamination or moisture condensation preventing operation termination step of returning to the air flow sensor flow rate measurement step again after performing the foreign material contamination or moisture condensation preventing operation performance step for a predetermined time.

11. The method of claim 10, wherein when the occurrence of the contamination by foreign materials or condensation of moisture on the sensor measurement plate is not predicted in the foreign material contamination or moisture condensation occurrence prediction step, the method returns to the air flow sensor flow rate measurement step to continuously measure the intake air flow rate by the air flow sensor.

12. The method of claim 10, wherein in the foreign material contamination or moisture condensation occurrence prediction step, it is predicted that the contamination by foreign materials occurs when a concentration of particulate matter measured by a particulate matter sensor of the vehicle is equal to or more than a reference value determined through an experiment.

13. The method of claim 10, wherein in the foreign material contamination or moisture condensation occurrence prediction step, it is predicted that the contamination by foreign materials occurs when a concentration of particulate matter, which is obtained based on an official environment report and current vehicle location data, is equal to or more than a reference value determined through an experiment.

14. The method of claim 10, wherein in the foreign material contamination or moisture condensation occurrence prediction step, the predicting of the occurrence of the condensation of moisture is performed by calculating a dew point based on a humidity value measured by a humidity sensor of the vehicle and an amount of change in temperature measured by a temperature sensor.

15. The method of claim 10, wherein in the foreign material contamination or moisture condensation occurrence prediction step, the predicting of the occurrence of the condensation of moisture is performed by calculating a dew point based on a humidity value measured by a humidity value that is obtained based on an official environment report and current vehicle location data.

16. The method of claim 10, wherein in the foreign material contamination or moisture condensation occurrence prediction step, the condensation of moisture is predicted based on experiential mapping data based on an amount of change in temperature measured by a temperature sensor.

17. The method of claim 10, wherein in the foreign material contamination or moisture condensation preventing operation performance step, the operation for preventing the contamination by foreign materials or the condensation of moisture heats the sensor measurement plate entirely including a temperature sensor for a predetermined time.

18. The method of claim 17, wherein the sensor measurement plate is heated using a chip heating function of the air flow sensor.

19. The method of claim 10, wherein the operation for preventing the contamination by foreign materials or the condensation of moisture turns off the sensor measurement plate for a predetermined time.

20. The method of claim 10, wherein during the foreign material contamination or moisture condensation preventing operation performance step, the intake air flow rate is measured using a model value through an intake air pressure or an opening amount of a throttle.

* * * * *